(12) United States Patent
Borio et al.

(10) Patent No.: US 10,813,294 B2
(45) Date of Patent: Oct. 27, 2020

(54) SELECTION DEVICE FOR SELECTIVE PRUNING APPLICABLE ON PRUNING MACHINES

(71) Applicant: B.M.V. DI BORIO VALERIO & C. S.N.C., Alba (IT)

(72) Inventors: Stefano Borio, Alba (IT); Aleandro Ottanelli, Alba (IT); Piero Fiorino, Alba (IT); Elettra Marone, Alba (IT)

(73) Assignee: B.M.V. DI BORIO VALERIO & C.S.N.C., Alba (CN) (IT)

( * ) Notice: Subject to any disclaimer, the term of this patent is extended or adjusted under 35 U.S.C. 154(b) by 747 days.

(21) Appl. No.: 15/323,649

(22) PCT Filed: Jul. 2, 2015

(86) PCT No.: PCT/IB2015/054976
§ 371 (c)(1),
(2) Date: Jan. 3, 2017

(87) PCT Pub. No.: WO2016/001864
PCT Pub. Date: Jan. 7, 2016

(65) Prior Publication Data
US 2017/0156270 A1    Jun. 8, 2017

(30) Foreign Application Priority Data
Jul. 3, 2014  (IT) ............................ TO2014A0535

(51) Int. Cl.
*A01G 3/04*    (2006.01)
*A01G 3/08*    (2006.01)
*A01G 3/053*   (2006.01)

(52) U.S. Cl.
CPC .......... *A01G 3/0426* (2013.01); *A01G 3/0535* (2013.01); *A01G 3/08* (2013.01)

(58) Field of Classification Search
CPC ....... A01G 3/0426; A01G 3/0417; A01G 3/08
See application file for complete search history.

(56) References Cited

U.S. PATENT DOCUMENTS

| 5,694,753 A * | 12/1997 | Dellinger ................. A01G 3/08 56/234 |
| 6,594,982 B1 | 7/2003 | Collard |
| 2003/0167746 A1 * | 9/2003 | Pellenc .................... A01G 3/04 56/330 |

FOREIGN PATENT DOCUMENTS

| EP | 0974262 A1 | 1/2000 |
| FR | 2795914 A1 | 1/2001 |
| WO | 2008/058348 A1 | 5/2008 |

OTHER PUBLICATIONS

Office Action from Chilean Application No. 2016-003382, dated Nov. 16, 2018.

(Continued)

*Primary Examiner* — Kristen C Hayes
(74) *Attorney, Agent, or Firm* — Merchant & Gould P.C.

(57) ABSTRACT

A selection device for pruning machines is designed to select branches or sprouts for pruning performed by the pruning machine. The selection device includes at least one fixing portion adapted for removably fixing to a pruning machine. The selection device includes at least one actuator designed to exert a force upon the branches and sprouts, thus moving them to cause the branches or sprouts selected for the pruning to be arranged in correspondence to cutting elements provided in the pruning machine, hence at least partially preserving the other branches or sprouts from pruning. A frame is designed to at least partially support the at least one actuator. At least one regulating mechanism is fixed to the frame, is associated with at least one actuator, and is designed to regulate at least the direction along which a force is exerted by at least one associated actuator.

17 Claims, 6 Drawing Sheets

(56) References Cited

OTHER PUBLICATIONS

International Search Report and Written Opinion from corresponding International Patent Application No. PCT/IB2015/054976, dated Oct. 5, 2015.

* cited by examiner

SELECTION DEVICE FOR SELECTIVE PRUNING APPLICABLE ON PRUNING MACHINES

This application is a National Stage Application of International Patent Application No. PCT/IB2015/054976, filed 2 Jul. 2015, which claims benefit of Serial No. TO2014A000535, filed 3 Jul. 2014 in Italy and which applications are incorporated herein by reference. To the extent appropriate, a claim of priority is made to each of the above disclosed applications.

BACKGROUND OF THE INVENTION

The present invention relates to a selection device for the selective pruning of plants, for example ornamental plants or fruit-bearing plants, which can be applied to a pruning machine. In particular, the present invention relates to a device, for selecting the type of branch to be pruned. This selection allows the cutting devices provided in a pruning machine to exclusively cut the type of branch selected by the selection device, thus preventing them from performing the pruning on undesired branches.

Pruning machines are known, for pruning plants by means of cutting devices. Said machines indistinctly cut all the branches that enter the field of action of the cutting devices.

Furthermore, people often have the problem of having to periodically cut ornamental and fruit-bearing plants, in order to keep a predetermined shape of the foliage of said plants.

Moreover, some plants knowingly produce flowers and/or fruits only on some vegetative parts of the plant itself, for example the sprouts or the branches.

For the purpose of the present description, the term "sprout" indicates the vegetation part of a plant, which has emerged in the last vegetative cycle of the plant. For the purpose of the present description, the term "branch" indicates the vegetative part of a plant, which has emerged prior to the last vegetative cycle of the plant. For the purpose of the present description, the term "vegetative cycle" indicates the vegetative phase of a plant during a solar year.

For example, a sprout of a plant, if it is not pruned, the following year can be considered as a branch. By way of example, some plants, such as olive trees, produce flowers and fruits only on the branches—more in particular, on the branches deriving from sprouts grown in the previous year; on the other hand, on the sprouts grown before the blossoming or on the branches that are more than one year old, they do not produce any flowers or fruits. Like olive trees, other types of flowering or fruit-bearing plants produce only on predetermined sprouts or branches.

Therefore, one or more types of sprouts or branches must be actively selected, thus preventing those sprouts or branches on the which the flower and/or fruit production is likely to occur from being pruned.

In the prior art there are no automatic machines or devices that are able to select the type of branch or sprout to be pruned, in order to permit a selective pruning.

This type of pruning is normally carried out by hand, since operators need to avoid an indiscriminate pruning in favour of a selective pruning.

SUMMARY OF THE INVENTION

The object of the present invention is to solve this technical problem as well as others linked to it, in order to permit a selective mechanical pruning.

The present invention relates to a selection device comprising actuator devices, for exerting a force upon branches or sprouts, so as to move certain branches or sprouts, namely so as to arrange the branches or sprouts to be pruned in correspondence to cutting elements of a pruning machine, thus preserving those that do not need to be pruned.

One aspect of the present invention relates to a selection device.

A further aspect of the present invention relates to an assembly of pruning machine and selection device.

BRIEF DESCRIPTION OF THE DRAWINGS

The features and advantages of the selection device and of the pruning machine-selection device assembly will be best understood upon perusal of the following detailed description of different possible explanatory—though non-limiting—embodiments and of the accompanying drawings, which respectively show what follows:

FIGS. 1A-1C show an assembly of pruning machine and selection device in a first embodiment comprising actuator elements, in particular pushing elements, namely blowers, for the selection of branches to be pruned exceeding a certain size; in particular.

FIGS. 3A-3C show an assembly of pruning machine and selection device in a second embodiment comprising actuator elements, in particular pushing elements, namely blowers, for the selection of branches to be pruned smaller than a certain size; in particular.

FIGS. 5A-5B show an assembly of pruning machine and selection device in a third embodiment comprising actuator elements, in particular pulling or attracting elements, namely sucking elements, for the selection of branches to be pruned smaller than a certain size; in particular.

FIGS. 7A-7B show an assembly of pruning machine and selection device in a fourth embodiment comprising actuator elements, in particular pushing elements, namely mechanical elements, for the selection of branches to be pruned smaller than a certain size; in particular.

FIG. 9A-9B show different schematic aspects of the selection device; in particular.

FIGS. 10A and 10B show two possible embodiments of the selection device associated with a pruning machine applied to an agricultural tractor; in particular.

DETAILED DESCRIPTION

With reference to the figures mentioned above, the selection device, which is indicated by number 3, is adapted to select branches or sprouts for the pruning.

Said selection device 3 is adapted to be applied to pruning machines 2 comprising cutting elements 22.

Said pruning machine 2 and said selection device 3 can make up an assembly.

Selection device 3 comprises at least one fixing portion 31 so as to be able to be fixed to a pruning machine 2 in a removable manner. Selection device 3 can be fixed to a pruning machine 2, in correspondence to said fixing portion 31, by means of screws and bolts. Fixing means that are equally suited to establish a removable connection must be considered as part of the present invention.

Said fixing portion 31, in the different embodiments that can be provided, can have different structural shapes and be fixed to different parts of the same pruning machine 2, as shown, by way of example, in the accompanying figures.

Preferably, said fixing portion 31 is fixed to a pruning machine 2 in correspondence to a portion of support frame 24 of the machine, which can be moved by means of an adjustment mechanism 26.

As a person skilled in the art knows, said adjustment mechanism 26 allows one or more cutting elements 22 to be arranged in the best possible configuration depending on the pruning action to be performed and on the shape of the plant to be pruned. With reference to the accompanying figures, a person skilled in the art can easily determine which adjustment mechanisms can be fitted on a pruning machine 2 and, for this reason, they will not be described in detail.

Selection device 3 comprises at least one actuator device 4, adapted to exert a force upon said branches and sprouts, thus moving them so as to cause the branches or sprouts selected for the pruning to be arranged in correspondence to cutting elements 22 provided in pruning machine 2, hence at least partially preserving the other branches or sprouts from the pruning.

By way of non-limiting example, in the accompanying figures there are arrows that approximately indicate the direction of the force exerted by said at least one actuator device 4.

Selection device 3 comprises a first frame 33, adapted to at least partially support said at least one actuator device 4. In a possible embodiment, said first frame 33 comprises said fixing portion 31.

Figure 3A:
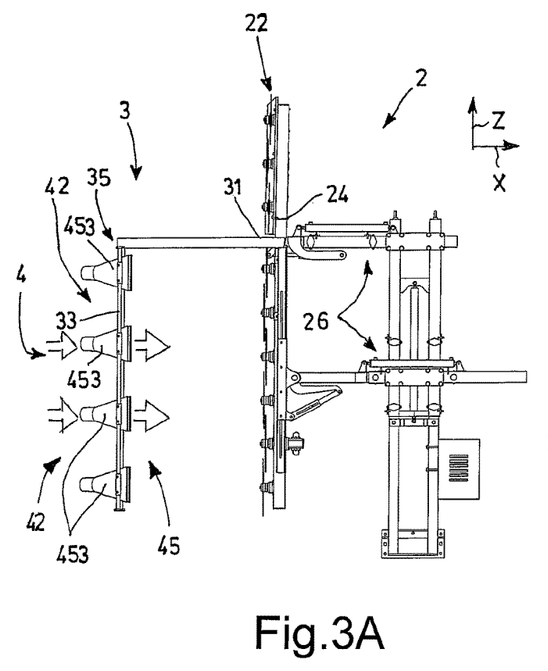
FIG. 3A shows the assembly in a front view relative to the moving direction of the assembly.
Figure 3B:
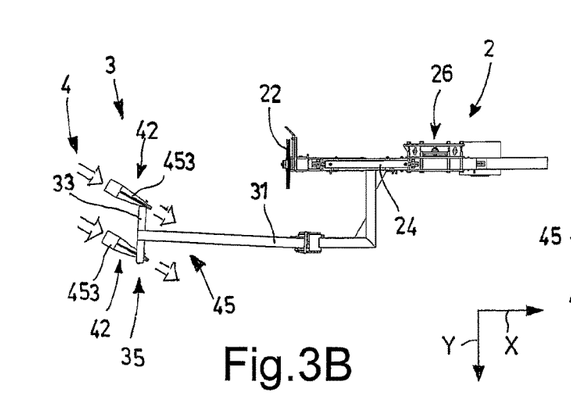
FIG. 3B shows the same assembly in a plant view from above.
Figure 3C:
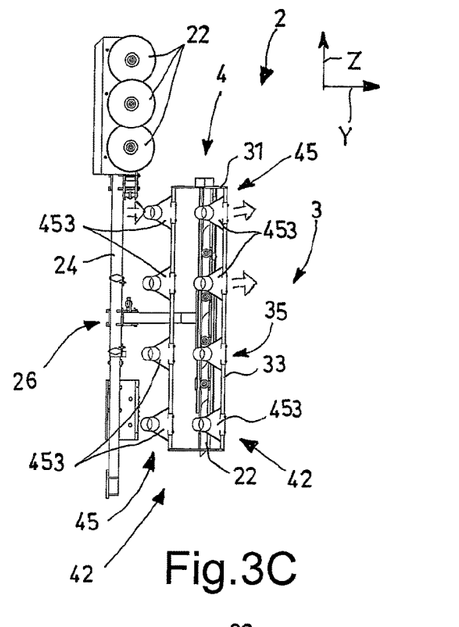
FIG. 3C shows the assembly in a lateral view.
Figure 4:
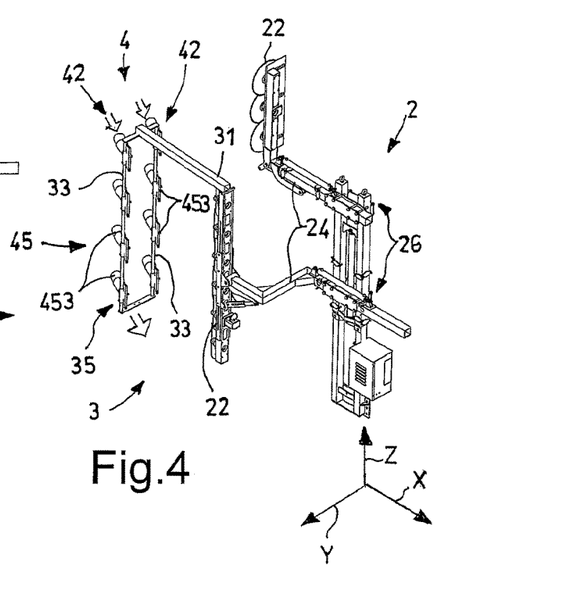
FIG. 4 shows the assembly of FIGS. 3A-3C in an axonometric view.
Figure 5A:
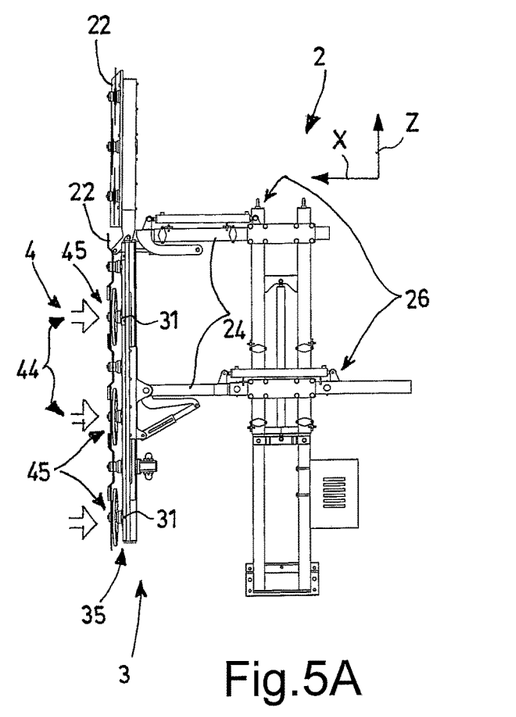
FIG. 5A shows the assembly in a front view relative to the moving direction of the assembly.
Figure 5B:
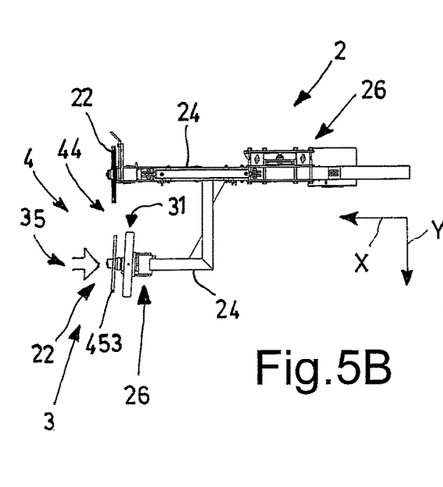
FIG. 5B shows the same assembly in a plant view from above.
Figure 5C:
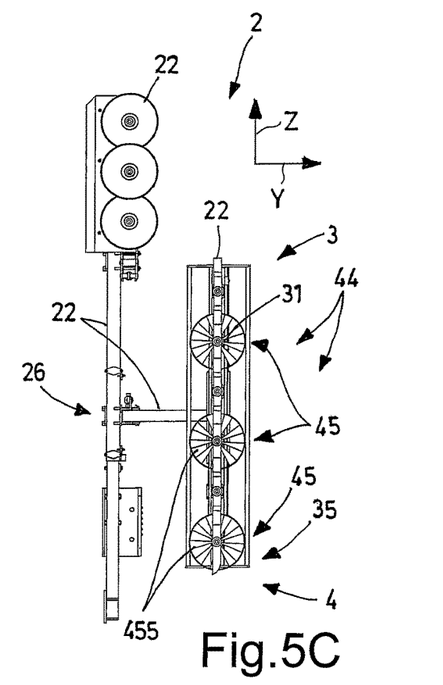
FIG. 5C shows the assembly in a lateral view.
Figure 6:
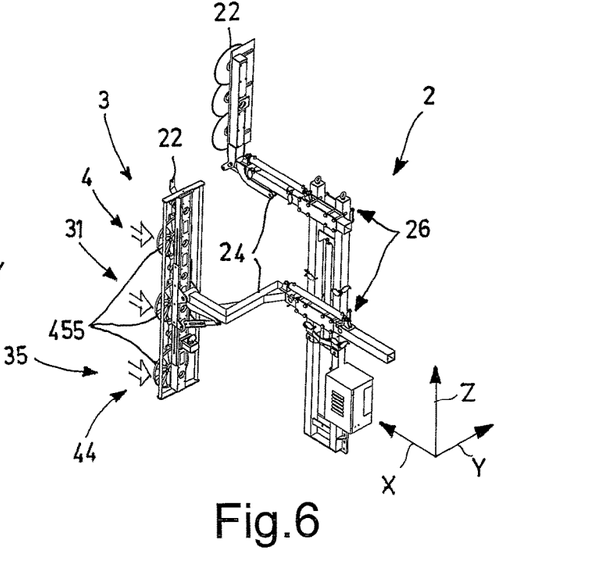
FIG. 6 shows the assembly of FIGS. 5A-5C in an axonometric view.

Said first frame 33 can be an independent structure, as show for example in FIGS. 1A-4, or it can be built-in in the frame of pruning machine 2, as shown for example in FIGS. 5A-6. In this last embodiment, fixing portion 31 coincides with the part of selection device 3 that is fixed to pruning machine 2, and in particular to the portion fixing actuator device 4 to machine 2 itself.

Selection device 3 advantageously comprises at least one regulating mechanism 35, which is fixed to said first frame 33 and is associated with at least one actuator device 4. Said regulating mechanism 35 is adapted to regulate at least the direction along which a force is exerted by at least one actuator device 4 associated therewith. Said regulating mechanism 35 regulates at least the direction along which the force is exerted relative to a plane on which actuator device 4 lies. In an explanatory—though non-limiting—embodiment, said regulating mechanism 35 can regulate the direction along which the force is exerted in a space area defined by three axes that intersect said actuator device 4 and are perpendicular to one another.

Said regulating mechanism 35 can also be adapted to vary the force exerted by said actuator device 4.

In an explanatory embodiment, which is not described herein, said regulating mechanism 35 is independent of adjustment mechanism 26 of the pruning machine 2.

Said regulating mechanism 35 can also act as a fixing element to fix actuator device 4 to the first frame 33 of selection device 3.

Said regulating mechanism 35 can regulate the direction of each single actuator device 4 or of an array of actuator devices 4, for example all fixed to a common frame or to a portion thereof.

In a possible embodiment, said at least one actuator device 4 comprises pushing means 42, adapted to exert a pushing force to move the branches or sprouts that have to be preserved from the pruning, thus allowing the branches or sprouts to be pruned to be arranged in correspondence to cutting elements 22 of a pruning machine 2. This embodiment is shown, by way of example, in FIGS. 1A-2 and 7A-8.

In a possible alternative embodiment of the present invention, said pushing means 42 are adapted to exert a pushing force to move the branches or sprouts that have to be pruned, thus causing them to be arranged in correspondence to cutting elements 22 of a pruning machine 2. This embodiment is shown, by way of example, in FIGS. 3A-4.

In a possible embodiment of selection device 3, said pushing elements 42 are yielding mechanical elements 43. This embodiment is shown, by way of example, in FIGS. 7A-8.

In general, said actuator device 4 can be a mechanical element 43, preferably a yielding element.

Said yielding mechanical elements 43, in a possible explanatory—though non-limiting—embodiment, comprise: at least one striker portion 431, adapted to strike against said branches or sprouts, thus pushing them; and at least one elastic element 432, adapted to allow said striker portion 431 to change its position, thus yielding when a threshold of the resistance exerted by the branches or sprouts upon striker portion 431 itself is exceeded.

In a possible embodiment, said yielding mechanical elements 43 allow the sprouts and branches that are smaller than a certain diameter, normally coinciding with the branches generated in the previous vegetative phase of the plant, to be kept away from cutting elements 22. The branches of the plant that normally identify the branches generated no less that two vegetative phases before, since they are larger and more rigid, overcome the force generated by actuator device 4, thus getting close to the cutting elements, in order to be pruned.

In this embodiment, by means of said regulating mechanism 35, the mechanical resistance generated by the yielding mechanical elements 43 can be changed.

In a possible alternative embodiment, which is not shown herein, said yielding mechanical elements 43 allow the sprouts and branches that are smaller than a certain diameter, normally coinciding with the branches generated in the previous vegetative phase of the plant, to get close to cutting elements 22. The branches of the plant that normally identify the branches generated no less that two vegetative phases before, since they are larger and more rigid, overcome the force generated by actuator device 4, thus keeping away from the cutting elements, hence preserving themselves from the pruning.

In a further alternative embodiment of selection device 3, said at least one actuator device 4 comprises pulling or attracting elements 44, adapted to exert a pulling or attracting force to move the branches or sprouts. In a possible embodiment, said pulling or attracting elements 44 are adapted to pull or attract the branches or sprouts that have to be pruned, thus allowing the branches or sprouts to be pruned to be arranged in correspondence to the cutting elements of a pruning machine. This embodiment is shown, by way of example, in FIGS. 5A-6.

In a possible alternative embodiment, which is not shown herein, said pulling or attracting elements 44 are adapted to pull or attract the branches or sprouts that have to be preserved from the pruning, thus allowing the branches or sprouts that are not pulled or attracted to be arranged in correspondence to the cutting elements of a pruning machine, so as to be pruned.

In a possible embodiment of selection device 3, said pushing, pulling or attracting elements (42, 44) are pneumatic devices 45, which can be blower devices or sucking devices.

In general, said actuator device 4 can be a pneumatic device 45.

Said pneumatic devices 45, in a possible explanatory—though non-limiting—embodiment, comprise rotary means 451, adapted to generate an air flow. A possible explanatory—though non-limiting—embodiment of the pneumatic device is shown, by way of example, in FIG. 9A. An equivalent embodiment is shown, by way of example, in FIGS. 5A-6.

Figure 9A:
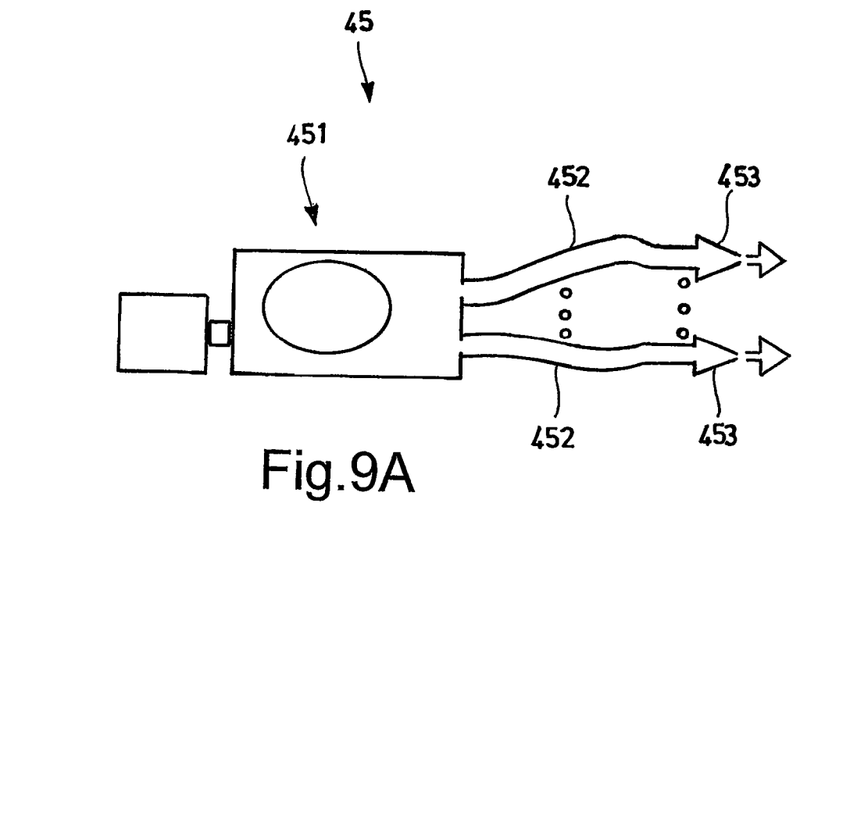
FIG. 9A shows a sketch for the generation of air needed to allow the embodiments of FIGS. 1A-4 to operate.

In a possible embodiment, said pneumatic devices 45, in particular the blower devices, comprise, furthermore, at least one supply nozzle 453 to supply the air flow produced by said rotary means 451; and at least one duct 452, adapted to lead the air flow generated by said rotary means 451 towards said supply nozzles 453. FIG. 9A shows a pneumatic device comprising, for example, a compressor or a sucking device, wherein there are provided said rotary means 451, which are connected to ducts 452, which respectively end with nozzles 453, through which air can flow out or can be sucked in.

Preferably, each one of said nozzles 453 is shaped so as to generate an air blade.

Said nozzles 453, in the embodiments shown herein, comprise a joining portion, so as to be connected to said ducts 452, and a tapered portion, adapted to create a opening, through which air can flow out and which substantially extends along an axis, thus allowing said nozzle to channel the air and obtain an air blade.

In the embodiment of FIGS. 5A-6, the actuator device is a pneumatic device 45, which is a rotary means 451. In the explanatory embodiment, said pneumatic device 45 is arranged close to cutting elements 22, thus obtaining, for example, a sucking device. The same embodiment can be changed so as to allow pneumatic device 45 to act as a pushing device.

Said rotary means 451 preferably comprises blades 455, which have a suitable shape, if necessary, are inclined and are designed to rotate around an axis. Said blades 455, by rotating, generate an air flow. Said rotation axis is parallel to the direction along which the pushing or pulling force is exerted by the air.

Depending on the direction of rotation of said blades 455, pneumatic device 45 can act as a pushing element, if it generates an air flow that pushes the branches or sprouts away by blowing, or as a pulling or attracting element, if it generates an air flow that attracts the branches or sprouts by sucking.

Cutting elements 22 provided in the present embodiment can help exert the force upon the branches or sprouts, in order to select the branches or sprouts to be pruned. For this reason, cutting elements 22 can fulfill the function of pushing elements by pushing small-sized sprouts or branches or they can fulfill the function of pulling or attracting elements by attracting small-sized sprouts or branches.

In an alternative explanatory—though non-limiting—embodiment, said cutting element 22 can be said actuator devices 4, in particular pushing elements.

A generic selection device 3 comprises a plurality of actuator devices 4, adapted to preferably exert a concordant force.

Said plurality of devices 4 are arranged along at least one straight line, preferably along the longitudinal extension of frame 33.

In the embodiments shown in FIGS. 1A-6, there are two parallel rows of actuator devices 4.

For the sake of simplicity and to avoid misunderstandings in the comprehension of the accompanying figures, by way of non-limiting example, for each selection device 3 shown there is represented a generic actuator device 4 and, at the same time, the figures indicate whether said actuator device 4 is a pushing element 42 or a pulling or attracting element 44 as well as, finally, the single type of actuator device used in the different embodiments; in particular, whether of mechanical 43 or pneumatic 45, showing the single features of each element. For the same reason, in the accompanying figures regulating mechanism 35 is generically indicated, in the majority of figures, close to an actuator device 4. This indication is not supposed to have any limiting effect and, on the contrary, it is aimed at indicating that, in the different embodiments, it can take on different embodiments with different degrees of freedom for the regulation of one or more actuator devices 4.

Selection device 3 can comprise moving devices, adapted to allow said selection device 3 to move in the space, for example relative to pruning machine 2.

If necessary, in a possible embodiment, said selection device 3 is constrained, in a removable manner, to said pruning machine 2, thus moving with the latter in an integral manner. In this last embodiment, the moving device of selection device 3 can coincide with adjustment mechanism 26 of pruning machine 2.

Regulating mechanism 35 of selection device 3 is designed to regulate the position of at least one actuator device 4, preferably of each actuator device 4, regardless of whether they are pushing elements 42 or pulling or attracting elements 44.

Figure 9B:
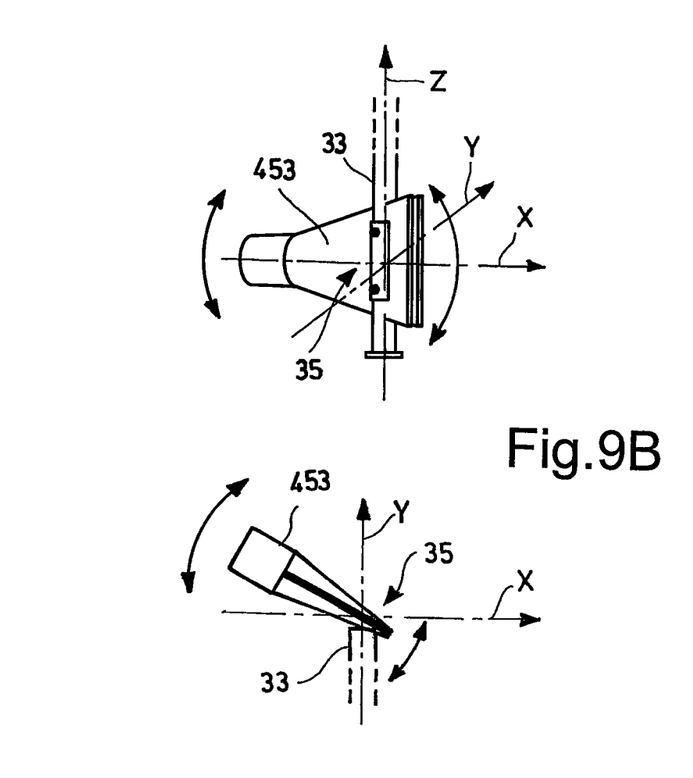
FIG. 9B shows, in two views, the regulating mechanism and the possible regulations of an actuator device, in particular a pneumatic one, for example a pusher.

FIG. 9B shows, by way of example, how said regulating device 35 can regulate at least the position of one nozzle 453.

As shown in FIG. 9B, by way of example, said regulating mechanism 35 enables the rotation around a first axis "Y" and/or around a second axis "Z", which preferably substantially coincides with the longitudinal extension of the first frame 33, on which actuator devices 4 are fixed.

Said first axis "Y", said second axis "Z" and said third axis "X" are perpendicular to one another, thus defining a space in which each actuator device 4 can move, exerting the force along the desired direction.

In the explanatory embodiment of FIG. 9B, said regulating mechanism 35 is made by means of removable clamping elements, which can be locked on a portion of selection device 3, for example on said frame 33, or on a portion of pruning machine 2, thus allowing operators, through screws and bolts, to regulate the position of actuator device 4.

Alternative embodiments of regulating mechanism 35, which are equally adapted to permit the regulation of one or more actuator devices 4, must be considered as part of the scope of protection of the present invention.

A further embodiment of regulating mechanism 35, besides permitting the regulation of each actuator device 4, can also permit the regulation of a plurality of actuator devices 4, for example arranged in an array, thus allowing said array, for example, to rotate around the longitudinal axis along which the array itself develops.

Figure 1A:
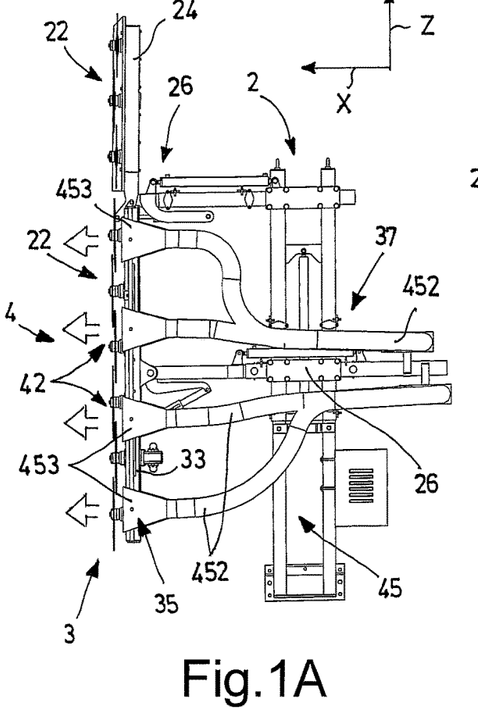
FIG. 1A shows the assembly in a front view relative to the moving direction of the assembly.
Figure 1B:
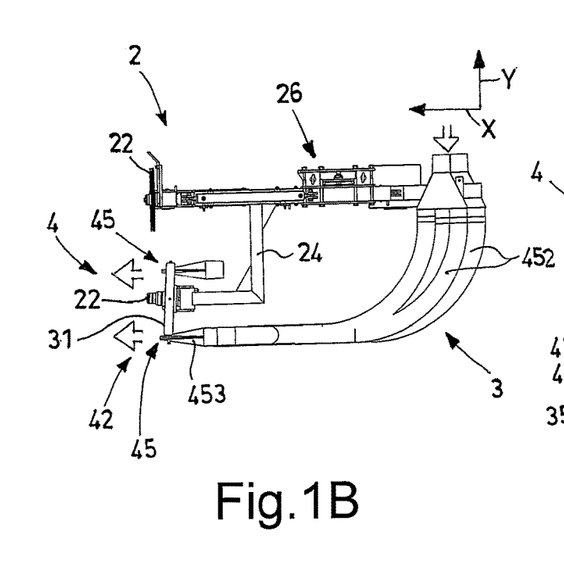
FIG. 1B shows the same assembly in a plant view from above.
Figure 1C:
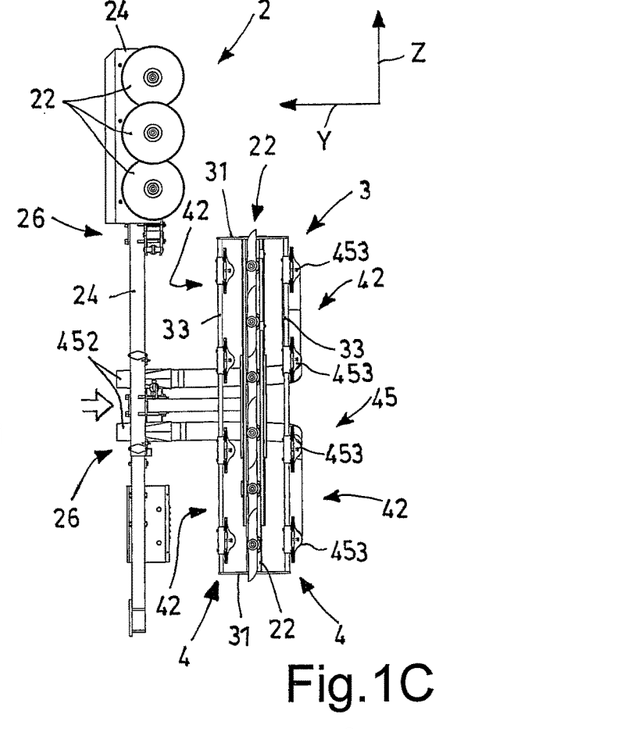
FIG. 1C shows the assembly in a lateral view.
Figure 2:
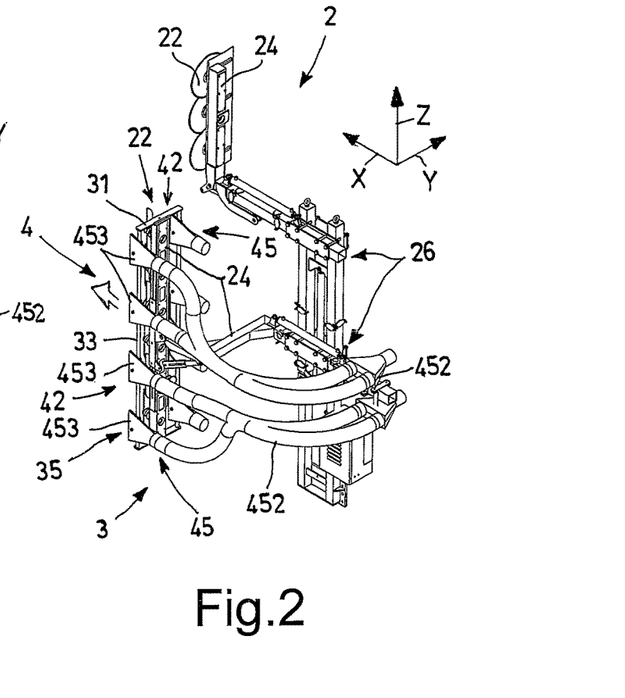
FIG. 2 shows the assembly of FIGS. 1A-1C in an axonometric view.

FIGS. 1A-1C show, by way of example, an assembly of pruning machine 2 and selection device 3 in a first embodiment comprising actuator devices 4, which are pushing elements 42, in particular pneumatic devices 45, more in particular blower devices, for the selection of branches to be pruned exceeding a given size.

In this embodiment there are more than one pushing element 42. In particular, fixing portion 31 of selection device 3 is such that it can be fixed to support frame 24 of machine 2, in the portion where some of cutting elements 22 are arranged, in particular at the ends of said support frame 24. The first frame 33 of selection device 3 consists, for example, of two columns arranged next to the portion of support frame 24 where cutting elements 22 are located. In the embodiment shown, said pushing elements 42 are obtained by means of pneumatic devices 45 comprising a plurality of nozzles 453. Said nozzles 453 are properly arranged along said columns, preferably at the same distance from one another. More preferably, for each cutting element 22, two nozzles 453 are provided on the two sides thereof, so as to maximize the pushing effect used to push small-sized sprouts and branches away from the field of action of cutting elements 22, thus selecting—for the pruning—only large-sized branches, which are not moved by the pushing force generated by the air.

Said regulating mechanism 35 allows the air emission direction to be regulated by moving said nozzles 453 at least in the plane on which the column on which they are fixed lies. Furthermore, said regulating mechanism allows nozzles 453 to rotate around the longitudinal axis of the column on which nozzles 453 themselves are fixed.

Furthermore, selection device 3 can be regulated in its position relative to pruning machine 2, for example by means of said fixing portion 31.

Pneumatic device 45 is not entirely shown, since you can only see said nozzles 453 and ducts 452 to lead the air produced by the rotary means, which are not shown. A possible schematic embodiment of the pneumatic device, in particular a blower device, in shown, by way of example, in FIG. 9A. The movement of the rotary means, which are adapted to generate the air to be blown by mean of nozzles 453, can be caused by an agricultural tractor "T", shown for example in FIG. 10A, by operating the power takeoff.

FIGS. 3A-3C, on the other hand, show an assembly of pruning machine 2 and selection device 3 in a second embodiment comprising actuator devices 4, which are pushing elements 42, in particular pneumatic devices 45, more in particular blower devices, for the selection of branches to be pruned that are smaller than given size.

In this embodiment there are more than one pushing element 42. In particular, fixing portion 31 of selection device 3 is such that it can be fixed to support frame 24 of machine 2, in the portion where some of cutting elements 22 are arranged, in particular at one end of said support frame 24. Said fixing portion 31 generates a portal in which, on one side, there are actuator devices 4 and, on the other side, there are cutting elements 22. Therefore, said portal surrounds the plant that must undergo the pruning process.

The first frame 33 of selection device 3 consists, for example, of two columns, which are arranged next one another and face the portion of support frame 24 where cutting elements 22 are located. In the embodiment shown, said pushing elements 42 are obtained by means of pneumatic devices 45 comprising a plurality of nozzles 453. Said nozzles 453 are properly arranged along said columns, preferably at the same distance from one another.

Said regulating mechanism 35 allows the air emission direction to be regulated by moving said nozzles 453 at least relative to a plane on which the column on which they are fixed lies.

In particular they are oriented so as to exert a pushing force upon the branches and sprouts, before branches and sprouts reach the area of cutting elements 22. With this pushing force, only small-seized sprouts or branches are pushed towards cutting elements 22 and, therefore, are pruned, thus preserving large-sized branches, which are not moved towards cutting elements 22. Furthermore, said regulating mechanism 35 allows nozzles 453 to rotate around the longitudinal axis of the column on which nozzles 453 themselves are fixed.

Furthermore, selection device 3 can be regulated in its position relative to pruning machine 2, for example by means of said fixing portion 31.

The figures only show said nozzles 453, whereas the rotary elements and ducts 452 are not shown; however, a person skilled in the art can easily assume that selection device 3 comprises ducts 452 to lead the air produced by the rotary means towards said nozzles 453.

FIGS. 5A-5C show an assembly of pruning machine and selection device in a third embodiment comprising a plurality of actuator devices 4, which can be both pulling or attracting elements 44 and pushing elements 42, depending on the activation of actuator devices 4 themselves.

If actuator devices 4 act as pulling or attracting devices 44, selection device 3 permits the selection of branches to be pruned that are smaller than a certain seize, thus leading to a selection effect that is similar to the one of the device shown in FIGS. 3A-4. If, on the other hand, actuator devices 4 act as pushing devices 42, selection device 3 permits the selection of branches to be pruned exceeding a certain seize, thus leading to a selection effect that is similar to the one of the device shown in FIGS. 1A-2. In this embodiment there are more than one actuator device, in particular a plurality of pneumatic devices 45. In particular, fixing portion 31 of selection device 3 substantially consists of a plurality of fixing portions, each adapted to fix an actuator device 4 to support frame 24 of machine 2, on the portion of support frame 24 where some of cutting elements 22 are arranged, in particular along the same straight line, more preferably alternated with said cutting elements 22. In the embodiment shown, said actuator devices 4 are pneumatic devices 45 comprising rotary blades 455, which fulfill the function of rotary means. Depending on the direction of rotation of said blades 455, actuator devices 4 can become pushing elements 42 or pulling or attracting elements 44. Said blades 455 are caused to rotate by said motor means or by a motion transmission circuit, for example one can exploit the circuit used to move cutting means 22.

In this embodiment, the transmission shaft with which pneumatic device 45 is fixed to pruning machine 2 in correspondence to support frame 24 on which cutting elements 22 are located could be considered as frame 33 of selection device 3; on the other hand, the portion of the shaft connected to the motion transmission mechanism could be considered as fixing portion 31 of selection device 3.

In this embodiment, said regulating mechanism 35 permits the regulation of the air emission or intake direction by inclining said blades at least in the lying plane of support frame 24 on which actuator devices 4 are fixed, for example by means of said fixing portion 31.

Figure 7A:
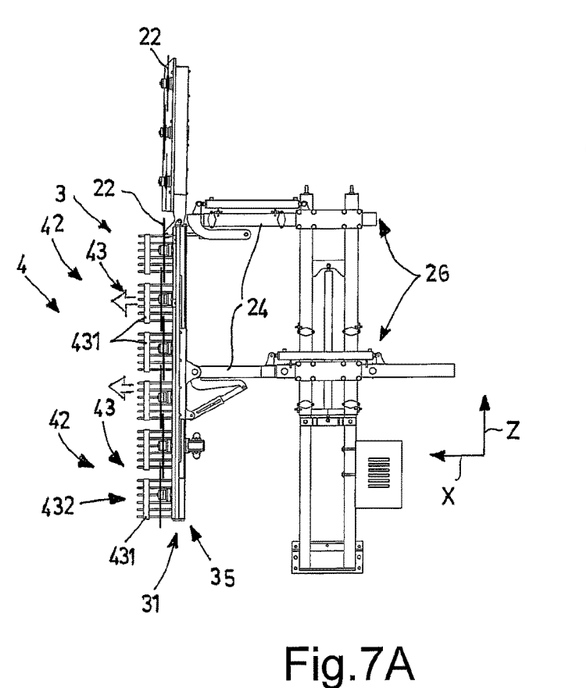
FIG. 7A shows the assembly in a front view relative to the moving direction of the assembly.
Figure 7B:
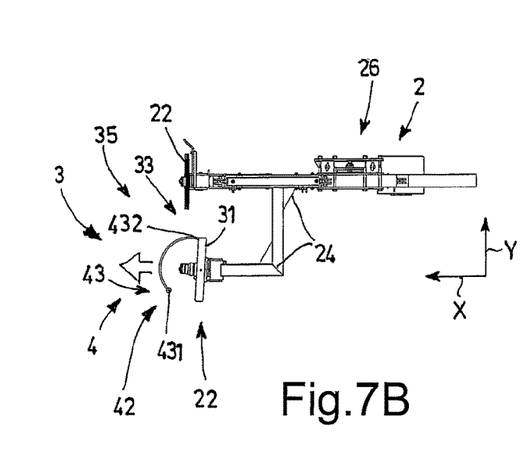
FIG. 7B shows the same assembly in a plant view from above.
Figure 7C:
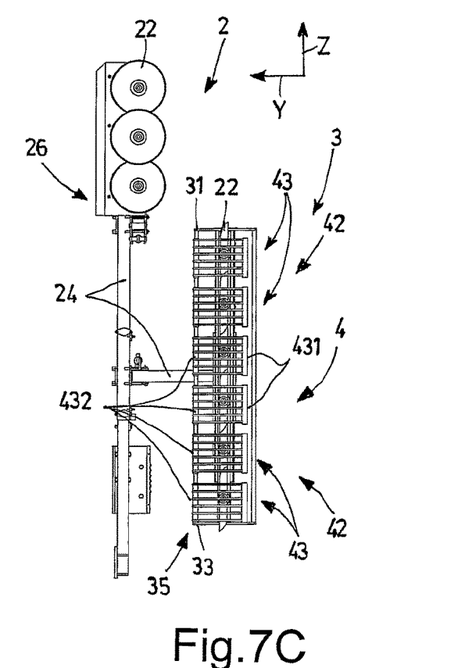
FIG. 7C shows the assembly in a lateral view.
Figure 8:
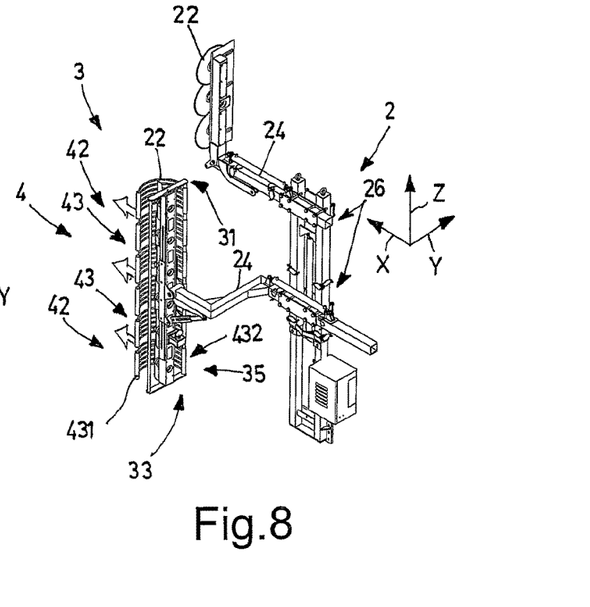
FIG. 8 shows the assembly of FIGS. 7A-7C in an axonometric view.

FIGS. 7A-7B show an assembly of pruning machine 2 and selection device 3 in a fourth embodiment comprising a plurality of actuator devices 4, in particular pushing elements 42, more in particular yielding mechanical elements 43.

Said embodiment is adapted for the selection of branches to be pruned exceeding a certain size, in particular said yielding mechanical elements 43 are adapted to exert a pushing force upon the branches, which, if small-sized, cannot overcome the elastic force exerted by pushing elements 42; therefore, small-sized sprouts or branches are pushed away from cutting elements 22, thus preserving them from the pruning. If the yielding mechanical elements 43 strike against branches with a certain size and/or rigidity that is such as to overcome the pushing force generated by mechanical elements 43, they yield, thus causing the branches to be arranged in correspondence to said cutting elements 22, which will prune said branches.

In an explanatory embodiment, which is not shown herein, selecting device 3, comprising said yielding mechanical elements 43, is adapted for the selection of branches to be pruned that are smaller than a certain size, in particular said yielding mechanical elements 43 are adapted to exert a pushing force upon the branches, which, if small-sized, cannot overcome the elastic force exerted by pushing elements 42 and, therefore, are pushed close to cutting elements 22, thus being pruned. If the yielding mechanical elements 43 strike against branches with a certain size and/or rigidity that is such as to overcome the pushing force generated by mechanical elements 43, they yield, thus allowing the branches to remain at a given distance from said cutting elements 22, hence preserving them from the pruning.

In general, said yielding mechanical elements 43 comprise: at least one striker portion 431, adapted to strike against said branches or sprouts, thus pushing them, and at least one elastic element 432, adapted to allow said striker portion 431 to change its position, thus yielding when a threshold of the resistance exerted by the branches or sprouts upon striker portion 431 itself is exceeded. In the embodiment shown, said striker portion comprises an element that is parallel to the longitudinal extension of the support frame along which cutting elements 22 are arranged. Said elastic element 432 is obtained by means of a plurality of ling-limbed elements, which, at one end, are fixed to said striker portion 431 and, at the other end, are fixed to fixing portion 31 or to the first frame 33 of selection device 3.

This embodiment creates a cantilever, against which the branches or sprouts strike.

Said elastic elements 432 are shaped so as to obtain a curved shape, in order to increase the elastic effect of actuator device 4.

As shown in FIG. 7B, said at least one actuator device 4, consisting of yielding mechanical elements, is arranged around cutting elements 22, so as to move away small-sized sprouts or branches, thus keeping them at a proper distance from cutting elements 22, and yield in case of large-sized branches, thus moving them close to cutting elements 22, which will then prune these branches.

In this embodiment, mechanical elements 43—and in particular elastic elements 432—keep pusher element 42 in an initial configuration. When the force exerted by one or more branches overcomes the elastic force generated by pushing elements 42, said yielding mechanical elements 43—and, in particular, said elastic elements 432—are compressed, thus leaving uncovered the portion pruning machine 2 in front of cutting elements 22.

As soon as the opposing force exerted by the branches ceases or decreases, mechanical elements 43 of pushing elements 42—and, in particular, elastic elements 432—go back to their initial configuration, thus allowing operators to select again branches or sprouts to be pruned.

Regulating mechanism 35, in the present embodiment, besides regulating the direction along which each actuator device 4 can exert the pulling or pushing force, can change the elastic resistance generated by the single yielding mechanical element 43 by changing, in a mechanical manner, the elastic characteristic of elastic element 432.

In an explanatory—though non-limiting embodiment, said regulating mechanism 35 of selection device 3, in the embodiment in which the actuator device is a pneumatic device, can be able to change the shape of air jet blown out, for example by changing the shape of one or more nozzles 453.

Furthermore, said first frame 33 of selection device 3 can be obtained from said support frame 24 of the pruning machine or from protection structures that are already available in a pruning machine known to a person skilled in the art. In this last embodiment, selection device 3 and, in particular, actuator devices 4 are fixed to the pruning machine depending on the desired selection effect.

In order to make the description of its features easier, selection device 3 according to the present invention has always been associated with a pruning machine 2. This aspect, though, should not be considered as limiting, since said selection device 3 is an independent device, which can be applied to any pruning machine 2, even those with features that are different from the ones described above.

Figure 10A:
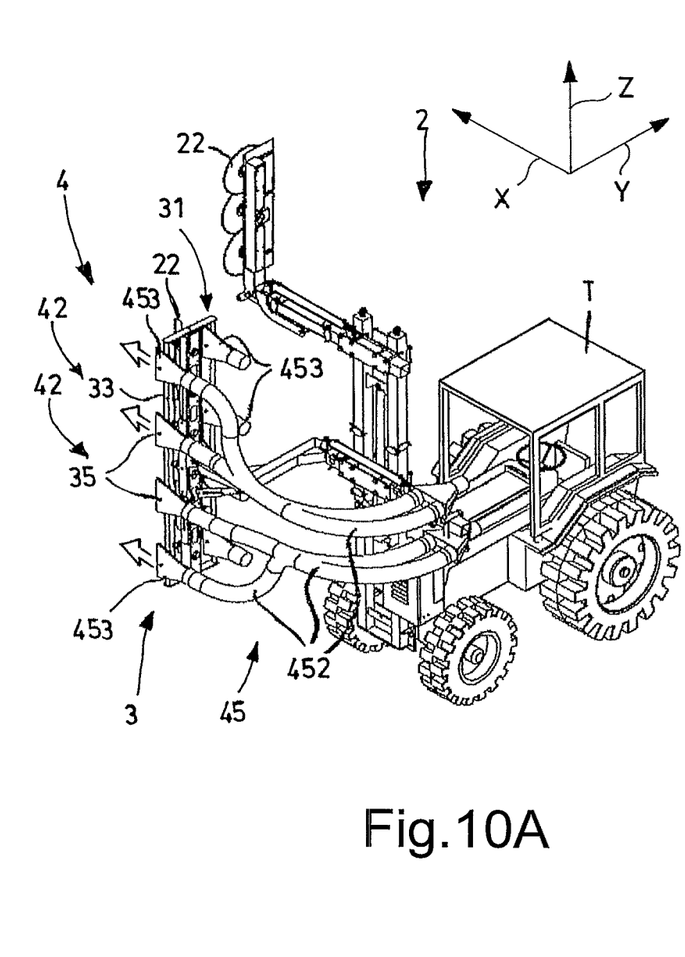
FIG. 10A shows the connection of an assembly of pruning machine and selection device in the embodiment of FIGS. 1A-2.
Figure 10B:
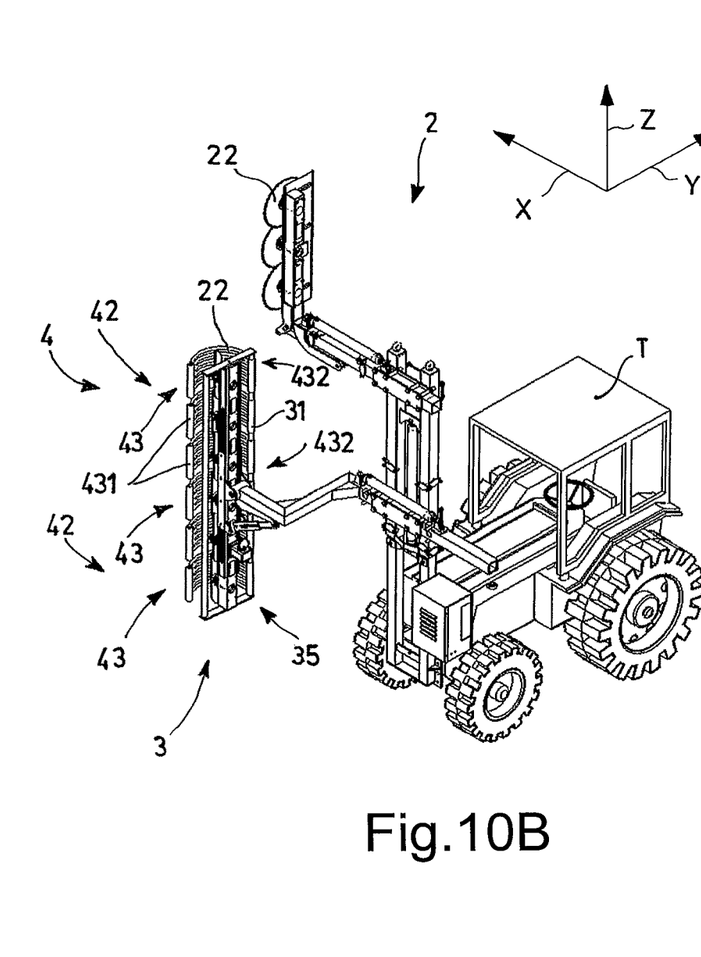
FIG. 10B shows the connection of an assembly of pruning machine and selection device in the embodiment of FIGS. 7A-8.

The assembly of pruning machine 2 and selection device 3 shown in the accompanying figures is especially suited to be associated with an agricultural tractor "T", as shown, for example, in FIGS. 10A-10B, or to moving means in general, such as, for example, self-propelled means.

In general, said pruning machine comprises at least one cutting element 22, adapted to rotate around its own axis; and a support frame 24, on which said cutting elements 22 are mounted in a rotary manner. Said cutting elements are adapted to rotate around an axis that is perpendicular to the surface described defined by support frame 24.

Said pruning machine 2 preferably comprises at least one adjustment mechanism 26, adapted to adjust said cutting element 22, thus adjusting the space position of one of them or of an array of cutting elements 22.

Selection device 3 according to the present invention is fixed, in a removable manner, to a portion of said support frame 24 of pruning machine 2.

Said cutting elements 22 can be knives, which are shaped so as to generate an air flow in a direction that depends on the direction of rotation of the cutting elements themselves; alternatively, they can be cutting discs.

Support frame 24 of pruning machine 2 comprises the frame portion used to support cutting devices 22 and the mechanisms for the handling thereof, the portion adapted to be moved by adjustment mechanism 26, normally made up of tubular structures, and the coupling portion to fix pruning machine 2 to a moving means, such as, for example, an agricultural tractor "T", as clearly shown in the accompanying figures.

Embodiments that can be considered as an alternative to the different embodiments shown and described herein, are suited to fulfill the function of selection device and are obvious for a person skilled in the art must be considered as part of the scope of protection of the present invention.

NUMERICAL REFERENCES

Pruning machine 2
Cutting elements 22
Support frame 24
Adjustment mechanism 26
Selection device 3
Fixing portion 31
First frame 33
Regulating mechanism 35
Actuator device 4
Pushing elements 42
Yielding mechanical elements 43
Striker portion 431
Elastic element 432
Pulling or attracting elements 44
Pneumatic device 45
Rotary means 451
Duct 452
Nozzles 453
Blades 455
Agricultural tractor "T"
First axis "Y"
Second axis "Z"
Third axis "X"

The invention claimed is:

1. A selection device for pruning machines, for selecting branches or sprouts for pruning, which is performed by said pruning machine; said selection device comprises:
   at least one fixing portion configured to removably fix to a pruning machine;
   at least one actuator device exerting a force upon said branches and sprouts, to move said branches and sprouts so as to cause the branches or sprouts selected for pruning to be arranged in correspondence to cutting elements provided in the pruning machine, to at least partially preserve other branches or sprouts from the pruning;
   a first frame at least partially supporting said at least one actuator device;
   at least one regulating mechanism, which is fixed to said first frame, is associated with at least one actuator device to regulate at least the direction along which a force is exerted by at least one actuator device associated therewith;
   wherein said at least one actuator device comprises pushing elements for exerting a pushing force to move the branches or sprouts to be preserved from pruning, to arrange the branches or sprouts to be pruned in correspondence to the cutting elements of the pruning machine.

2. A selecting device according to claim 1, wherein said at least one actuator device further comprises pushing, elements for exerting a pushing force to move the branches or sprouts to be pruned, thus arranging the branches or sprouts that have to be pruned in correspondence to the cutting elements of the pruning machine.

3. A device according to claim 2, wherein said at least one actuator device further comprises pulling or attracting elements, and wherein said pushing or pulling or attracting elements are pneumatic devices.

4. A device according to claim 2, wherein said at least one actuator device further comprises pulling or attracting elements, and wherein said pushing or pulling or attracting elements are blowers.

5. A device according to claim 1, wherein said pushing elements are yielding mechanical elements.

6. A device according to claim 5, wherein said yielding mechanical elements comprise:
   at least one striker portion configured for striking against said branches or sprouts, thus pushing said branches or sprouts;
   a support frame, on which said cutting elements are mounted in a rotary manner;
   at least one adjustment mechanism, for adjusting said cutting elements, thus changing space position;
   wherein the selection device according to claim 1 is removably fixed to said support frame.

7. A device according to claim 1, wherein said at least one actuator device further comprises pulling or attracting elements to exert a pulling or attracting force to move the branches or sprouts that have to be preserved, thus arranging the branches or sprouts to be pruned in correspondence to the cutting elements of the pruning machine.

8. A device according to claim 1, wherein said at least one actuator device further comprises pulling or attracting elements to exert a pulling or attracting force to move the branches or sprouts that have to be pruned, thus arranging the branches or sprouts to be pruned in correspondence to the cutting elements of the pruning machine.

9. A device according to claim 1, wherein said at least one actuator device further comprises pulling or attracting elements, and wherein said pushing or pulling or attracting elements are pneumatic devices.

10. A device according to claim 9, wherein said pneumatic devices comprise:
    an air flow generator.

11. A device according to claim 10, wherein said pneumatic device comprises:
    at least one supply nozzle, which supplies;
    at least one duct, for leading the air flow generated by said air flow generator towards at least one supply nozzle.

12. A device according to claim 11, wherein each one of said nozzles is shaped so as to generate an air blade.

13. A device according to claim 1, wherein a plurality of actuator devices are provided, for exerting a concordant force;
    said plurality of devices is arranged along at least one straight line.

14. A device according to claim 1, wherein said at least one actuator device further comprises pulling or attracting elements, and wherein said pushing or pulling or attracting elements are blowers.

15. An assembly consisting of a pruning machine and selection device; said pruning machine comprises:

at least one rotary cutting element;

wherein said at least one actuator device comprises pulling or attracting elements to exert a pulling or attracting force to move the branches or sprouts that have to be preserved and arranging the branches or sprouts to be pruned in correspondence to the cutting elements of the pruning machine.

16. An assembly according to claim 15, wherein said cutting elements are knives that are shaped so as to generate an air flow in a direction that depends on a direction of rotation of the cutting elements.

17. A selection device for pruning machines, for selecting branches or sprouts for pruning performed by said pruning machine; said selection device comprising:

at least one fixing portion configured to removably fix to a pruning machine;

at least one actuator device exerting a force upon said branches and sprouts, to move said branches and sprouts to arrange the branches or sprouts selected for pruning in correspondence to cutting elements provided in the pruning machine, to at least partially avoid pruning other branches or sprouts;

a first frame at least partially supporting said at least one actuator device;

at least one regulating mechanism, which is fixed to said first frame, is associated with at least one actuator device to regulate at least a direction along which a force is exerted by at least one actuator device associated with the at least one regulating mechanism;

at least one elastic element configured to allow said striker portion to change position to yield when a threshold of resistance exerted by the branches or sprouts upon the striker portion is exceeded.

\* \* \* \* \*

UNITED STATES PATENT AND TRADEMARK OFFICE
CERTIFICATE OF CORRECTION

| | | |
|---|---|---|
| PATENT NO. | : 10,813,294 B2 | Page 1 of 1 |
| APPLICATION NO. | : 15/323649 | |
| DATED | : October 27, 2020 | |
| INVENTOR(S) | : Stefano Borio et al. | |

It is certified that error appears in the above-identified patent and that said Letters Patent is hereby corrected as shown below:

On the Title Page

(30) Foreign Application Priority Data: "Jul. 3, 2014 (IT) TO2014A0535" should read
--Jul. 3, 2014 (IT) TO2014A000535--

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*